United States Patent
Chan et al.

(10) Patent No.: US 11,747,605 B2
(45) Date of Patent: Sep. 5, 2023

(54) SYSTEM AND METHOD FOR FORMATION AND DETECTION OF IMMERSION FLUID BOLUSES ON A MICROSCOPE OBJECTIVE

(71) Applicant: Molecular Devices, LLC, San Jose, CA (US)

(72) Inventors: Matthew Chan, Palo Alto, CA (US); Steven Luke, Downington, PA (US)

(73) Assignee: Molecular Devices, LLC, San Jose, CA (US)

( * ) Notice: Subject to any disclaimer, the term of this patent is extended or adjusted under 35 U.S.C. 154(b) by 264 days.

(21) Appl. No.: 16/392,478

(22) Filed: Apr. 23, 2019

(65) Prior Publication Data

US 2020/0341259 A1    Oct. 29, 2020

(51) Int. Cl.
*G02B 21/33* (2006.01)
*G02B 21/02* (2006.01)
*G02B 21/06* (2006.01)

(52) U.S. Cl.
CPC .............. *G02B 21/33* (2013.01); *G02B 21/02* (2013.01); *G02B 21/06* (2013.01)

(58) Field of Classification Search
CPC ........ G02B 21/33; G02B 21/34; G02B 21/26; G02B 21/002; G02B 21/02; G02B 21/06; G01N 1/30; G01N 21/28; G82Y 15/00; B82Y 15/00
See application file for complete search history.

(56) References Cited

U.S. PATENT DOCUMENTS

2006/0262419 A1* 11/2006 Harada .............. G02B 21/0088
                                                        359/656
2018/0348247 A1* 12/2018 Ando ................. G01N 35/1011

FOREIGN PATENT DOCUMENTS

| EP | 1703311 A1 | 9/2006 | |
| EP | 1713114 A1 * | 10/2006 | ......... G03F 7/70341 |
| JP | 2007264114 A | 10/2007 | |
| WO | WO-2019152740 A1 * | 8/2019 | ............. G01N 21/01 |
| WO | WO-2020083500 A1 * | 4/2020 | ......... G01N 15/1434 |

OTHER PUBLICATIONS

PCT International Search Report and Written Opinion In International Application PCT/US2020/029516, dated Aug. 7, 2020, 10 pages.

\* cited by examiner

*Primary Examiner* — Alicia M Harrington
(74) *Attorney, Agent, or Firm* — Merchant & Gould P.C.

(57) ABSTRACT

Microscope imaging system and method for bolus formation and detection. In an exemplary method, immersion fluid may be delivered onto a front end of an objective of the imaging system to form one or more boluses. Each bolus may have a rounded outer surface intersected by an optical axis defined by the objective. At least a portion of each bolus may be illuminated. Light may be detected from each illuminated bolus to create detection data. A value representing a size of each bolus may be determined using the detection data. Delivery of the immersion fluid may be adjusted, if needed, based on the value(s) determined.

21 Claims, 8 Drawing Sheets

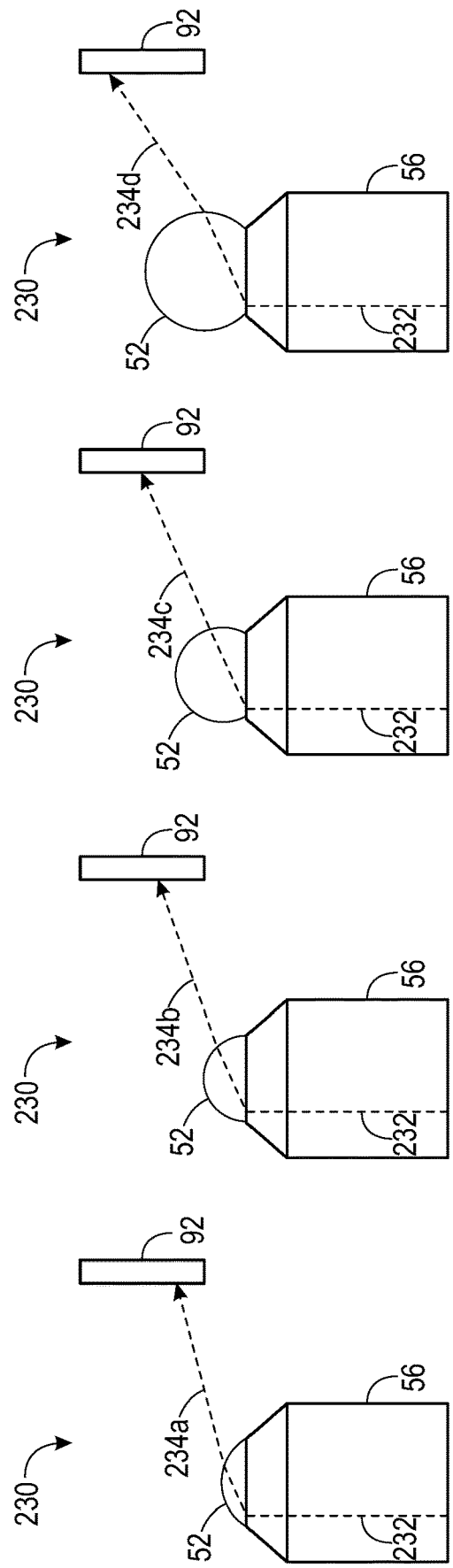

SYSTEM AND METHOD FOR FORMATION AND DETECTION OF IMMERSION FLUID BOLUSES ON A MICROSCOPE OBJECTIVE

INTRODUCTION

The ability of a microscope to resolve fine detail in a specimen is dependent on the numerical aperture of the microscope's objective. The numerical aperture is a dimensionless value characterizing the objective's ability to gather light in a given medium. More specifically, the numerical aperture is a product of (a) the sine of the maximum half-angle of the cone of light that can enter the front lens of the objective, and (b) the refractive index of the medium in which the objective gathers light. The numerical aperture can be increased dramatically by changing the medium from air to an immersion fluid of higher refractive index, such as water, oil, or glycerol.

Smaller structures in a specimen diffract incident light more strongly. Accordingly, immersion microscopy with a higher power objective is often utilized to gather light over a wider angle to resolve these smaller structures. This immersion technique images the specimen through a layer of immersion fluid sandwiched between the objective and a specimen container, such as a multi-well plate or a slide. In a typical implementation, a small amount of immersion fluid is placed onto the front lens of the objective (or onto a surface of the sample holder) to form a "bolus," which then is flattened by contact with the sample holder (or the front lens of the objective) to create a sandwiched layer of immersion fluid.

The processes of bolus formation and flattening can be automated to increase throughput for an immersion microscope. However, such an automated microscope system may not be sufficiently robust. Improved immersion microscope systems are needed.

SUMMARY

The present disclosure provides a microscope imaging system and method for bolus formation and detection. In an exemplary method, immersion fluid may be delivered onto a front end of an objective of the imaging system to form one or more boluses. Each bolus may have a rounded outer surface intersected by an optical axis defined by the objective. At least a portion of each bolus may be illuminated. Light may be detected from each illuminated bolus to create detection data. A value representing a size of each bolus may be determined using the detection data. Delivery of the immersion fluid may be adjusted, if needed, based on the value(s) determined.

BRIEF DESCRIPTION OF THE DRAWINGS

FIGS. 9-12 are views of the objective and dedicated optical sensor of the embodiment of FIG. 8. Taken with boluses of different size formed on the objective to illustrate how the size of the bolus may change the position on the optical sensor at which light from the bolus is detected, in accordance with aspects of the present disclosure.

DETAILED DESCRIPTION

Figure 1:
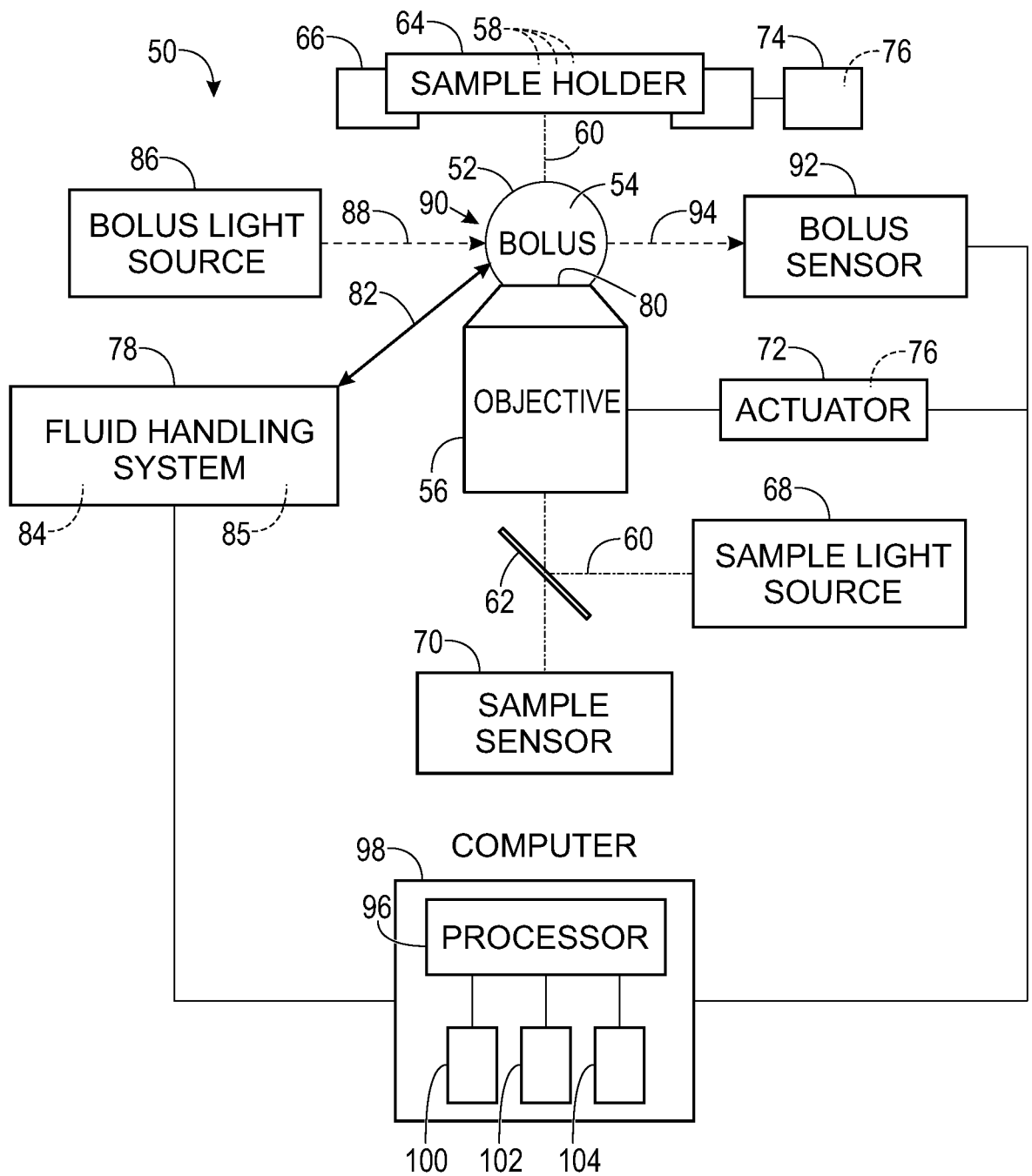
FIG. 1 is a schematic view of an exemplary microscope imaging system configured to optically monitor formation of immersion fluid boluses on an objective and to adjust delivery of immersion fluid when needed, in accordance with aspects of the present disclosure.

The present disclosure provides a microscope imaging system and method for bolus formation and detection. In an exemplary method, immersion fluid may be delivered onto a front end of an objective of the imaging system to form one or more boluses. Each bolus may have a rounded outer surface intersected by an optical axis defined by the objective. At least a portion of each bolus may be illuminated. Light may be detected from each illuminated bolus to create detection data. A value representing a size of each bolus may be determined using the detection data. Delivery of the immersion fluid may be adjusted, if needed, based on the value(s) determined.

Another exemplary method of bolus formation and detection is provided. In the method, a fluid delivery system of the imaging system may be signaled to deliver immersion fluid onto a front end of an objective of the imaging system in order to form one or more boluses each having a respective target size. A space that each bolus should overlap if the bolus has the target size may be illuminated. Light from the illuminated space may be detected when each bolus is expected to be present in the space. Whether each bolus is detectably present and/or deviates from the target size by less than a threshold amount may be determined based on the light detected.

An exemplary microscope imaging system with automated bolus formation and detection is provided. The imaging system may comprise an objective, and a stage to support a sample holder. The imaging system also may comprise a fluid delivery system configured to deliver immersion fluid onto a front end of the objective to form one or more boluses. The imaging system further may comprise a light source, at least one optical sensor, and a processor. The light source may be configured to produce light to illuminate at least a portion of each bolus. The at least one optical sensor may be configured to detect light from each illuminated bolus to create detection data. The processor may be configured to control operation of the fluid delivery system and to determine a value representing a size of each bolus using the detection data.

A microscope imaging system of the present disclosure may have any suitable combination of capabilities. The imaging system may have a fluid handling system that automatically forms a series of boluses on an objective by delivery of immersion fluid under control of a processor. The presence/absence and/or size of each bolus may be detected, during and/or after formation of the bolus, using an optical sensor(s) in communication with the processor. The operation of the fluid handling system may be automatically adjusted by the processor, if needed, based on the presence/absence and/or size detected for one or more of the boluses. For example, if one or more boluses are detected as being absent and/or as having an incorrect size (oversized or undersized), the fluid handling system may be instructed by the processor to take appropriate action, such as repeating bolus formation, cleaning the objective, enlarging a bolus with additional immersion fluid before it is flattened, increasing the flow rate and/or delivery duration of immersion fluid during subsequent bolus formation, signaling an error to the user, or the like. In other words, the optical sensor(s), processor, and fluid handling system may form a feedback loop to monitor and adjust bolus formation. This monitoring may, for example, detect sporadic, isolated issues with bolus formation, or a gradual drift in the size of boluses over time. Any of the boluses may be flattened after formation, by sandwiching immersion fluid of the bolus between the objective and a sample holder. A sample supported by the sample holder then may be imaged via light that passes through the sandwiched immersion fluid between the sample and the objective.

Further aspects of the present disclosure are described in the following sections: (I) definitions, (II) overview of microscope imaging systems with bolus detection, (III) methods of bolus formation and detection, and (IV) examples.

I. DEFINITIONS

Technical terms used in this disclosure have meanings that are commonly recognized by those skilled in the art. However, the following terms may be further defined as described below.

Bolus—a body of liquid having a rounded outer surface. The outer surface is shaped by surface tension at a liquid-gas (e.g., air) interface, and by gravity, and may include an apex or bottom of the bolus. The bolus also may have an inner surface shaped by a liquid-solid interface between the bolus and an objective.

Examination region—an area located on the optical axis of an imaging system into which a sample and/or a sample holder is placed for examination (e.g., imaging with an image sensor). The examination region may be near or at a stage, which is a platform or other support for the sample and sample holder.

Image—an optical counterpart (i.e., an optical image) of an object (e.g., at least part of a sample), formed at a distance from the object and at least partially with light that has interacted with and/or was generated by the object, or a captured representation (i.e., a captured image) of the optical counterpart (and thus the object) created by detecting light of the optical counterpart. In some embodiments, the captured image may be a digital image, which is a numeric representation of the optical image (and object). When used as a verb, "image" means to form an optical image of an object and/or to capture the optical image.

Image sensor—an optical sensor that detects light forming an optical image and creates a captured image (e.g., a digital image) corresponding to the optical image. The coupled processes of light detection and image creation are described herein as image capture. An image sensor is capable of detecting spatial variations (e.g., variations in intensity) of light across a photosensitive detection area. The image sensor may be an array sensor, such as a charge-coupled device (CCD) sensor, an active pixel sensor (e.g., a complementary metal-oxide-semiconductor (CMOS) sensor), a hybrid CCD-CMOS sensor, or the like. The image sensor may create a raster image that is a representation of a two-dimensional image, such as a rectangular array of pixels, and may be configured to create color images, grayscale (monochromatic) images, or both. The imaging systems disclosed herein may have a single image sensor for capturing images of samples, or at least a pair of image sensors (e.g., one for capturing images of samples and another for capturing images of boluses).

Immersion fluid—a liquid for contacting a lens (e.g., a front lens) of an objective to change the index of refraction of the medium through which light propagates to the lens of the objective. The liquid has an index of refraction higher than air. Exemplary immersion fluids include water, glycerol, paraffin oil, cedarwood oil, synthetic oil, anisole, bromonaphthalene, and methylene iodide, among others.

Light—optical radiation, including ultraviolet radiation, visible radiation (i.e., visible light), and/or infrared radiation.

Light source—a device that generates light, such as a beam of light, by any suitable mechanism, including electroluminescence, stimulated emission, thermal radiation, and/or photoluminescence, among others. The light source may include a semiconductor device, laser (e.g., solid-state laser, gas laser, excimer laser, dye laser, semiconductor laser, etc.), arc lamp, and/or the like. Exemplary semiconductor light sources include laser diodes, light-emitting diodes (LEDs), and superluminescent diodes, among others. The light source also may include any suitable associated optical elements to shape, otherwise condition, or direct the light to a bolus, a space that boluses overlap, and/or an examination region.

Objective—an optical unit that collects light from an examination region of an imaging system. The optical unit generally constitutes at least the upstream end of the collection optics of an imaging system. The optical unit may include one or more optical elements (e.g., one or more lenses), a housing to hold the optical elements, a collar mounted firmly to the housing to facilitate bolus formation/removal, and/or the like. The objective, alone or in combination with one or more other optical elements (e.g., a tube lens and/or relay mirror) of the collection optics, is configured to form a conjugate image of an object (e.g., a sample)

located in the examination region. Accordingly, the objective may focus or generally collimate light received from the examination region. The objective and a stage (and/or examination region) may be movable relative to one another along the optical axis (such as along a z-axis), to change the focus setting of the objective.

Optical axis—an imaginary line representing the axis of rotational symmetry of an optical system, as defined by optical elements thereof. The optical axis generally corresponds to the optical path along which light propagates, such as from a light source to an examination region (and/or sample) and from the examination region (and/or sample) to a sensor. The optical axis may be "folded" by reflection, one or more times, which means that the axis changes direction, each time it is folded, by any suitable angle, such as 45, 60, 90, 120, 135, 150, or 180 degrees, among others.

Optical sensor—a device that creates a signal (e.g., an electrical signal) in response to incident light. An optical sensor may have an array of light-sensitive elements to detect spatial differences in incident light. The array may be a one-dimensional array as in a linear sensor, a two-dimensional array as in an image sensor, or the like.

Optics—a set of optical elements of an imaging system, which may be arranged along an optical path between a light source and an examination region and/or bolus (illumination optics) and/or along an optical path between the examination region and/or bolus and an optical sensor (collection optics). An optical element may be any device or structure that interacts with light, such as to collect, direct, focus, and/or collimate light, and/or at least partially block (e.g., filter) light. An optical element may function by any suitable mechanism, such as reflection, refraction, scattering, diffraction, absorption, and/or filtering, among others. Exemplary optical elements include lenses, mirrors, diffusers, gratings, prisms, filters, aperture members, masks, beam-splitters, transmissive fibers (fiber optics), and the like. In the present disclosure, boluses function as optical elements, such as lenses and/or mirrors, among others.

Processor—an electronic circuit(s) that performs operations on data. The processor may perform the operations based on a set of instructions. The data and/or instructions may be stored in memory that is external to the processor and/or the data may be provided by a data stream.

Sample—a specimen that is imaged. The sample may have any suitable properties. The sample may be organic and/or inorganic, natural and/or manufactured, and may include any suitable assembly, material, substance, isolate, extract, particles, or the like. In exemplary embodiments, the sample is a biological sample and includes biological cells to be imaged. The biological cells may be eukaryotic or prokaryotic, and may be alive or dead (e.g., fixed). Exemplary biological cells include established cells (cell lines), primary cells, cells of a tissue sample, cells from a clinical sample (e.g., a blood sample, a fluid aspirate, a tissue section, etc.), bacterial cells, or the like. The sample also may include any suitable medium, generally an aqueous medium, which may include water, gel, salts, buffer, glucose, detergent, dye, protein, amino acids, or any combination thereof, among others. The medium may or may not be a growth medium for biological cells.

Sample holder—a device for holding at least one sample or any array of spatially isolated samples. The sample holder may have a horizontal wall including a proximal surface (closer to the objective) and a distal surface (farther from the objective), which may be parallel to one another. The sample may be located on the distal surface, and an optical image of the sample may be formed with light that has passed through the horizontal wall at least once or twice. The horizontal wall may be the bottom wall of a well (e.g., forming the floor of the well), a coverslip, or the like.

The sample holder may include at least one well. The well may have any suitable total capacity for fluid, such as less than about 10, 5, 2, 1, 0.5, 0.2, or 0.1 mL, and/or greater than about 0.025, 0.05, 0.1, 0.2, 0.5, or 1 mL, among others. The inside diameter of the well may be constant or may vary (e.g., may decrease) from the top to the floor of the well. If the inside diameter decreases toward the floor, the diameter may decrease smoothly, stepwise, or a combination thereof. In some embodiments, the inside diameter may decrease linearly, or smoothly but non-linearly. The shape of the well, as defined in horizontal cross-section, may be constant or may vary from the top to the floor of the well. This shape, and/or the perimeter of the floor, may be circular, oval, polygonal (e.g., rectangular, such as square), or the like. The well may be formed of any suitable material, although polymer may be preferred. The floor and/or side walls of the well may be coated with another material, such as collagen, laminin, fibronectin, or the like, to promote cell adhesion.

The well may be provided by a sample holder (e.g., a multi-well plate) having an array of wells. The wells of the sample holder may be attached to one another (e.g., formed integrally with one another, such as by injection molding) to form a multi-well sample holder having a horizontal array of wells with floors and/or bottom walls that are substantially coplanar with one another. The sample holder may have any suitable number of wells, such as at least or exactly 4, 6, 12, 24, 48, 96, or 384 wells, among others. The wells may be arranged in a rectangular array, for example, a 2-by-3 array for a multi-well plate having six wells or an 8-by-12 array for a multi-well plate having 96 wells.

In other embodiments, the sample holder may be an assembly of a slide and a coverslip.

II. OVERVIEW OF MICROSCOPE IMAGING SYSTEMS WITH BOLUS DETECTION

This section provides an overview of the microscope imaging systems of the present disclosure, as exemplified by microscope imaging system 50. The system is designed to detect boluses (such as bolus 52) formed with immersion fluid 54 on a microscope objective 56; see FIGS. 1-4. Imaging system 50 may include any suitable combination of the components and features described below.

Imaging system 50 may be configured to capture an image of a sample 58 located on an optical axis 60 defined by optical elements, such as objective 56 and a beam-splitter 62. (Other optical elements have been omitted to simplify the optical train.) Sample 58 (or a plurality of samples 58) may be contained by a sample holder 64, which in turn may be supported by a stage 66. Objective 56 may be located under sample 58 (and sample holder 64), as shown here for an inverted microscope, or over the sample and sample holder as in a conventional microscope.

Optical axis 60 may extend from a sample light source 68 to sample 58, and from sample 58 to a sample image sensor 70 (also called a sample sensor or an image sensor). Light generated by sample light source 68 illuminates sample 58. Sample sensor 70 may capture an image of the sample by detecting light from sample light source 68 downstream of the sample and/or may detect photoluminescence resulting from excitation with light from sample light source 68. Sample illumination may be epi-illumination via objective 56, as shown here, or trans-illumination, among others. In some embodiments, sample sensor 70 may be replaced by, or supplemented with, an eyepiece(s) to allow the user to view the sample as an optical image.

Objective 56 and stage 66 may be movable relative to one another along at least a z-axis via at least one actuator, such as an objective actuator 72 and/or a stage actuator 74. Each actuator may include at least one motor 76 to drive movement of the objective or stage or may be operated manually. In the depicted embodiment, objective actuator 72 drives objective 56 along a z-axis for sample focusing and creating/breaking contact between immersion fluid 54 and sample holder 64. However, in other embodiments, stage actuator 74 may perform these functions. Stage actuator 74 may drive xy-motion of the stage (e.g., for scanning the same or different samples 58), although in other embodiments, xy-motion of objective 56 may be driven by objective actuator 72.

Imaging system 50 has a fluid handling system 78 for transporting immersion fluid 54 to, and optionally from, a front end 80 of objective 56, as indicated by a double-headed arrow at 82. In other words, the fluid handling system can include a fluid delivery system 84 to form each bolus 52 successively, and a fluid collection system 85 to carry immersion fluid of each bolus away from objective 56. Further aspects of an exemplary fluid handling system 78 are described below with respect to FIG. 2.

Bolus detection may be performed with any suitable components. A bolus light source 86 (or sample light source 68) may create illumination light 88, such as a beam of illumination light, to illuminate a space 90 and/or at least a portion of bolus 52. Space 90 may be a sensed volume neighboring objective 56 that is expected to at least partially overlap bolus 52 if the bolus has at least a minimum size. (If smaller than the minimum size, the bolus will be undetectable.) A bolus optical sensor 92 (and/or sample sensor 70) may detect light 94 from illuminated space 90 and/or illuminated bolus 52. A processor 96 (e.g., of a computer 98) may determine the presence/absence and/or size of the bolus based on the light detected by at least one optical sensor (e.g., sensor 70 and/or 92). Accordingly, the light source for illumination may be different from sample light source 68, and may be dedicated to bolus illumination (e.g., see Examples 1 and 2), or sample light source 68 may perform double duty, namely, sample and bolus illumination (e.g., see Example 3). The optical sensor for detection of light from bolus 52 may be a bolus sensor 92 that is different from sample sensor 70, and may be dedicated to light detection from boluses (e.g., see Examples 2 and 3), or sample sensor 70 may capture sample and bolus images (e.g., see Example 3).

Processor 96 (and/or computer 98) may be in communication with, and/or may control operation of, any suitable combination of system devices. For example, processor 96 (and/or computer 98) may communicate with and/or control objective actuator 72 (particularly at least one motor 76 thereof), stage actuator 74 (particularly at least one motor 76 thereof), fluid handling system 78, each sensor 70, 92, and/or each light source 68, 86.

Computer 98 may have any suitable hardware to facilitate communication with, and/or operation of, processor 96. Exemplary hardware includes memory 100 storing instructions for processor 96 to perform and/or control any suitable procedures, such as delivery of immersion fluid by fluid delivery system 84, adjustment of the fluid delivery by system 84, bolus illumination with light from one of the light sources, light detection from each illuminated bolus to create detection data, determining a value representing a size of each bolus, and so on. Memory 100 also may store data related to the system, such as calibration data detected from boluses of known different sizes (see below). Exemplary user interfaces that may be suitable include an input device 102 (e.g., a keyboard, keypad, mouse, touchscreen, etc.) and an output device 104 (e.g., a monitor, printer, touchscreen, etc.). In some embodiments (e.g., with a touchscreen), the same device may handle input from the user and output from the processor.

Figure 2:
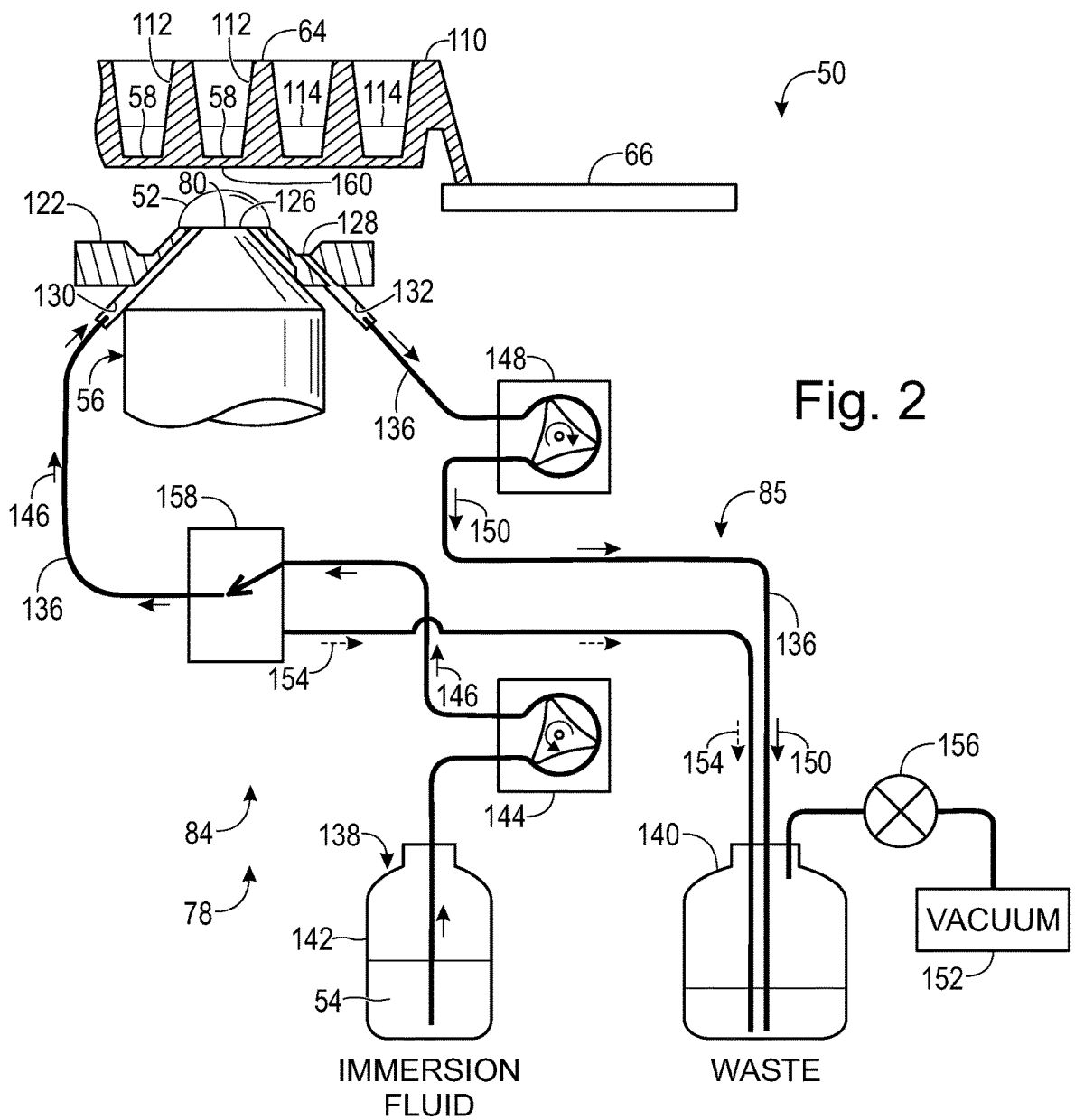
FIG. 2 is a schematic view of an exemplary fluid handling system for delivery and collection of immersion fluid in the microscope imaging system of FIG. 1, with a bolus located on a front end of the imaging system's objective (shown as fragmentary) and aligned with a well of a sample holder (shown sectioned) before the bolus has been flattened to a sandwiched layer of fluid by the sample holder, in accordance with aspects of the present disclosure.

FIG. 2 shows a more detailed view of an exemplary fluid handling system 78 for imaging system 50. Objective 56 is located under sample holder 64, which may be structured as a multi-well plate 110. The plate may have a two-dimensional array of wells 112 containing samples 58, such as sets of cells each located in a separate volume of a fluid medium 114, with each set located on the floor of a respective well 112. Bolus 52 is shown vertically aligned with one of wells 112 and is formed by a smaller volume of immersion fluid than the bolus of FIG. 1. Accordingly, the bolus of FIG. 2 may (or may not) need to be fed with additional immersion fluid before it is ready to be flattened by contact with sample holder 64 (see FIGS. 3 and 4), if it has not yet reached its target size.

Figure 3:
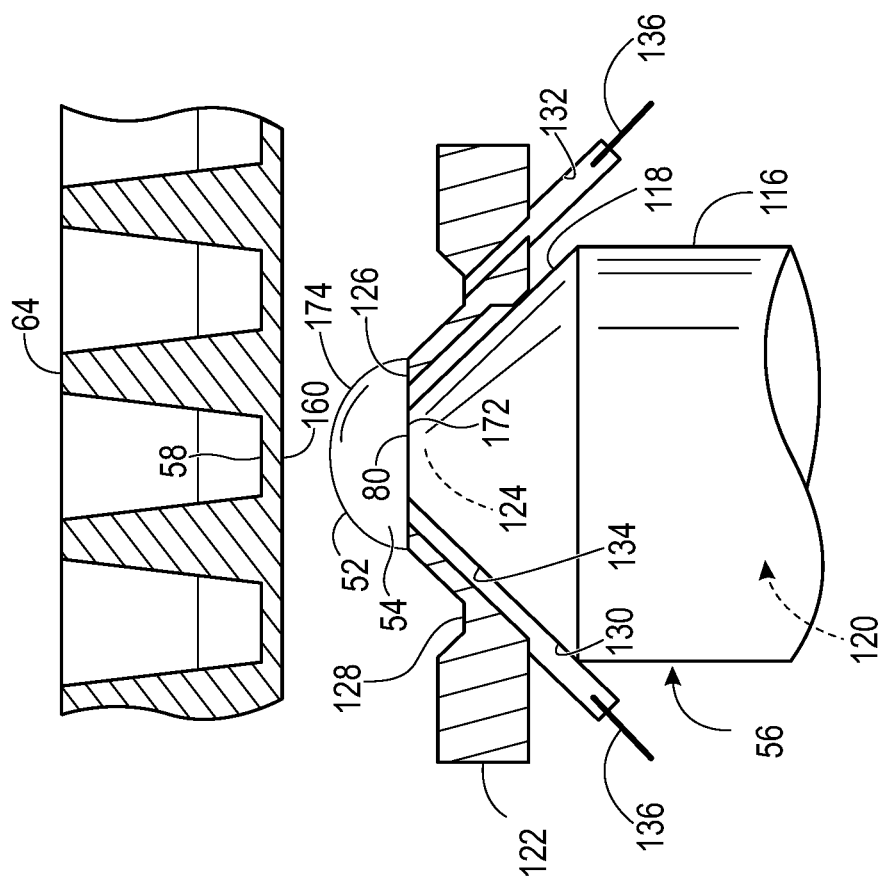
FIG. 3 is a magnified, fragmentary view of FIG. 2 taken around the objective, bolus, and sample holder.

FIG. 3 shows only a portion of FIG. 2 taken around objective 56. Objective 56 may have a housing 116 forming a tapered nose 118, one or more lenses 120 mounted in the housing, and a collar 122 extending around and mounted on nose 118. Lenses 120 may include a front lens 124 positioned near one end of housing 116. Nose 118, collar 122, and front lens 124 each more form part of a horizontal plateau 126 on which bolus 52 forms, such that, most importantly, the immersion fluid of bolus 52 covers the exposed surface of front lens 124. A frustoconical slope formed by collar 122, beginning abruptly at the edge of plateau 126, may restrict wetting of the surface of the objective past the edge, to prevent premature flow of immersion fluid 54 of bolus 52 off plateau 126 and into an annular trough 128 defined by collar 122.

Objective 56 has an inlet channel 130 for flow of immersion fluid 54 to plateau 126, and an outlet channel 132 for draining immersion fluid from trough 128. Inlet channel 130 becomes a circumferential channel 134 as it extends toward front end 80 of objective 56. Ring channel 134 may be formed as a gap between nose 118 and an underside of collar 122. Ring channel 134 may extend to plateau 126 and allows immersion fluid 54 to be added to bolus 52 more uniformly around the center of plateau 126.

FIG. 2 shows how inlet channel 130 and outlet channel 132 may be connected to other components of fluid handling system 78 with tubing 136, which is depicted with heavier lines. Fluid delivery system 84 of handling system 78 may extend from a source 138 of immersion fluid 54, via tubing 136, to inlet channel 130 and ultimately plateau 126. Fluid collection system 85 of handling system 78 may extend from trough 128, through outlet channel 132, and through tubing 136 to a waste receptacle 140.

Fluid delivery system 84 may include a vessel 142 to hold immersion fluid 54. A supply pump 144 may operate to drive immersion fluid 54 from vessel 142 to plateau 126, along a delivery path 146 indicated by arrows. Supply pump 144 is illustrated as a peristaltic pump, but any suitable type of pump may be used instead, such as a diaphragm pump, a syringe pump, or the like.

Fluid collection system 85 may include a drain pump 148 to drive waste fluid from trough 128 to receptacle 140, along a drain path 150 indicated by arrows. Drain pump 148 may be the same type as, or a different type of pump from, supply pump 144.

Fluid handling system 78 further may include a suction configuration that utilizes a vacuum pump 152 to create suction at plateau 126, via a suction path 154 indicated by dashed arrows. The suction configuration may be implemented by adjusting a vacuum valve 156 that places vacuum pump 152 in fluid communication with waste receptacle 140, which is sealed, and a two-position selector valve 158. When selector valve 158 has the first position shown in FIG. 2, immersion fluid 54 can flow from vessel 142 to inlet channel 130. When selector valve 158 is switched to the second position, vacuum pump 152 can draw immersion fluid 54 in reverse from inlet channel 130 to waste receptacle 140, along suction path 154. Accordingly, the suction configuration permits active removal of immersion fluid 54 located on or near plateau 126 and can be useful for implementing a cleaning procedure to wash any particles/debris from the front end of objective 56 and/or an adjacent surface 160 of sample holder 64, as described below in more detail in Section III.

Figure 4:
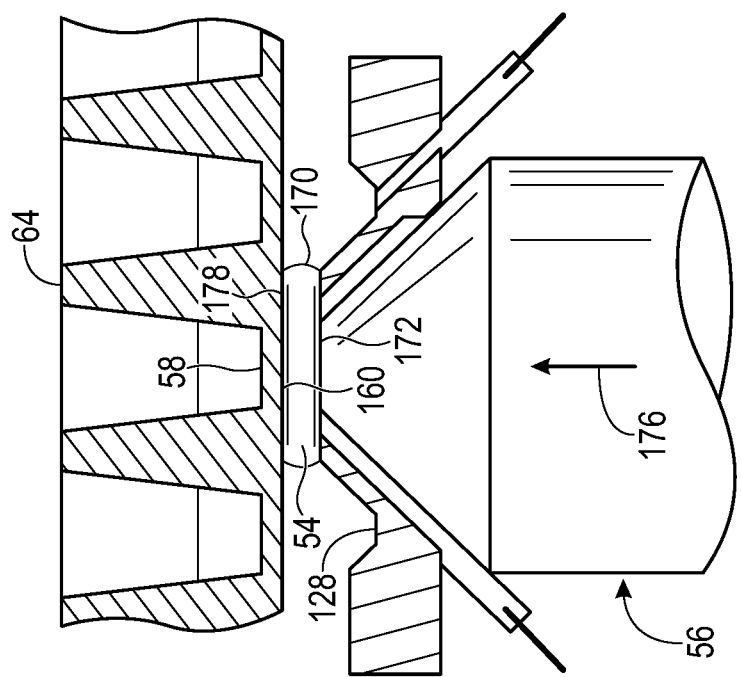
FIG. 4 is another magnified, fragmentary view of FIG. 2, taken as in FIG. 3 except after the bolus has been flattened to a layer of fluid between the objective and the sample holder.

FIGS. 3 and 4 show bolus 52 of FIG. 2 respectively before and after it has been flattened by contact with holder surface 160 of sample holder 64 to create a sandwiched layer 170 of immersion fluid 54. Bolus 52 of FIG. 3 has an inner surface 172 and a rounded outer surface 174, with rounded outer surface 174 being closer to holder surface 160. Inner surface 172 forms a liquid-solid interface with objective 56 at front end 80. Outer surface 174 is rounded due to surface tension and forms a liquid-gas interface with the surrounding air (or other gas). Front end 80 of objective 56 and holder surface 160 have been move closer together in FIG. 4 relative to FIG. 3, indicated by a motion arrow at 176 in FIG. 4. As a result, rounded outer surface 174 in FIG. 3 has become flattened outer surface 178 of sandwiched layer 170. The thickness of layer 170 can be decreased until sample 58 is in focus, and excess immersion fluid 54, if any, may flow into trough 128.

Further aspects of imaging system 50 and its use to form and detect boluses are described elsewhere herein, such as in Sections I, III, and IV.

III. METHODS OF BOLUS FORMATION AND DETECTION

Figure 5:
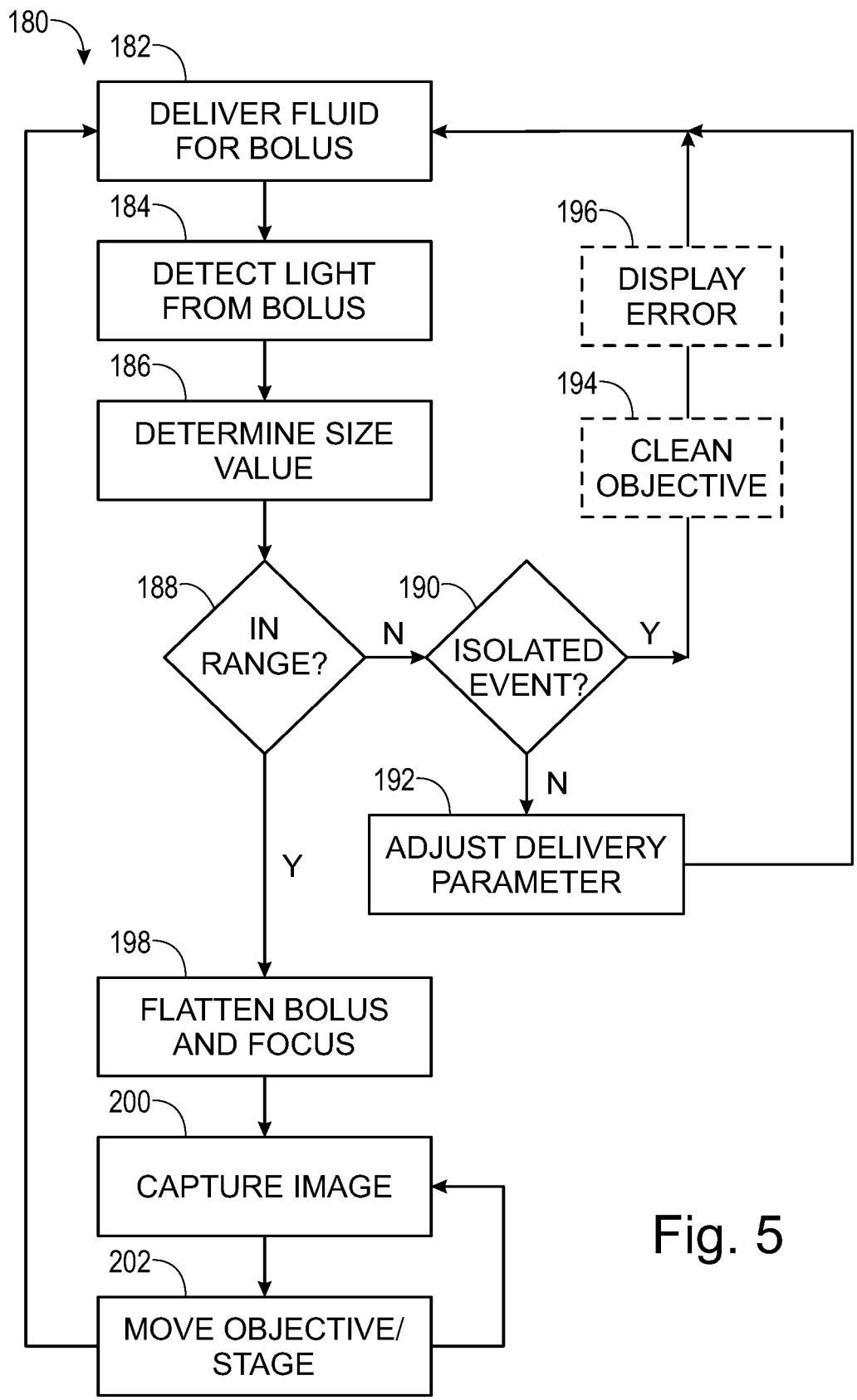
FIG. 5 is a flow chart of exemplary procedures that may be performed by the imaging system of FIG. 1 in a method of bolus formation and detection, in accordance with aspects of the present disclosure.

This section describes methods of bolus formation/detection and/or sample imaging, as exemplified by method 180; see FIG. 5 (also see FIGS. 1-4 for system components). The procedures described in this section may be performed, optionally automatically, in any suitable order and combination using any of the system configurations and/or procedures of the present disclosure.

Method 180 may be performed with a pre-calibrated imaging system, or one or more calibration procedures may be included in the method. Accordingly, calibration may be executed before the imaging system is shipped to the user, and/or the imaging system may be programmed to perform a calibration routine automatically when needed and/or when requested by the user. Calibration may involve (a) delivering different volumes of immersion fluid 54 to front end 80 of objective 56, to form calibration boluses 52 of different volumes (i.e., different "sizes"), (b) illuminating each calibration bolus 52 with illumination light 88 from light source 68 or 86, (c) detecting light from each calibration bolus 52 that emerges from, and/or is reflected by, the bolus using one or more optical sensors to obtain detection data, (d) determining a respective size-indicative value(s) from the detection data for each calibration bolus 52, and (e) correlating the volumes of calibration boluses 52 with their respective size-indicative values to obtain a function or table that relates bolus volumes to size-indicative values from detection data.

Procedure (a) of calibration may include placing immersion fluid 54 onto objective 56 with fluid delivery system 84 of fluid handling system 78. Calibration boluses of increasing size may be formed by successive enlargement of the smallest bolus with added immersion fluid, or the immersion fluid of each bolus may be removed substantially before forming the next bolus. The fluid delivery system may be pre-calibrated such that the absolute volume of each calibration bolus is known, and/or the volume of each calibration bolus (and/or the size of each bolus determined by method 180 (see below)) may be defined relatively according to one or more parameters of the fluid delivery system, such as pump speed and/or fluid delivery period (length of time) for bolus formation. Procedures (b) through (d) of calibration are similar or identical to those described in the following paragraphs for formation and detection of boluses in method 180.

Method 180 may be initiated with imaging system 50 after a sample holder 64 has been placed onto stage 66, but does not require the presence of the sample holder to test bolus formation in the upper portion of FIG. 5. At 182, immersion fluid 54 is delivered to a space 90 neighboring front end 80 of objective 56 in order to form a bolus 52. The delivery of immersion fluid in procedure 182 may be performed with fluid delivery system 84 as described above in Section I.

At 184, light 94 may be detected from space 90 and/or bolus 52. Space 90 may be illuminated with illumination light 88, such as beam of light, with the light incident on rounded outer surface 174 of the bolus (if the bolus is present and large enough to be detectable), or incident on the interface between bolus inner surface 172 (if present) and objective 56. Illumination light 88 may be collimated, divergent, or convergent, among others. Detected light 94 may originate from the light source, or illumination light 88 may stimulate photoluminescence of a photoluminophore in the immersion fluid, and the photoluminescence may be detected. In any event, light 94 is detected from space 90 and/or illuminated bolus 52. Light 94 that is detected by a given optical sensor device may have (i) entered and emerged from bolus 52 via its rounded outer surface 174, (ii) entered bolus 52 via inner surface 172 and emerged from bolus 52 via rounded outer surface 174, (iii) entered bolus 52 via rounded outer surface 174 and emerged from bolus 52 via inner surface 172, (iv) entered and emerged from bolus 52 via inner surface 172, and/or (v) been reflected by outer surface 174 without entering bolus 52. The detected light may have been reflected, refracted, and/or scattered, among others, by interaction with bolus 52.

At 186, a value(s) corresponding to the volume of bolus 52 (i.e., a size value) may be determined. The size value may be determined based on any suitable characteristic of detected light 94, such as its position, intensity, size, shape, and/or the like.

At 188, the size value may be compared to one or more predefined criteria, such as at least one or a plurality of thresholds, to determine whether the size value is acceptable for subsequent sample imaging. The size value may be compared to a predefined threshold (e.g., an acceptable minimum size) or a range encompassing a target value for bolus size. Accordingly, procedure 188 may determine whether the bolus falls within an acceptable size range, or is too small (and/or too large). If the size of the bolus is not acceptable (branch N), at procedure 190 the method may determine whether the deviation from acceptable bolus size is an isolated (sudden) event by comparing the current size value with previous size values. If the deviation from acceptable size is not an isolated event (branch N), but instead results from a drift in the operating efficiency of fluid delivery system 84 over time, at procedure 192 a delivery parameter of system 84 may be adjusted. For example, the delivery pump speed and/or period of fluid delivery may be changed to compensate for the drift in system efficiency, and then method 180 may return to procedure 182. In some embodiments, procedure 190 and/or procedure 192 may be performed even if, or only if, the size value is in an acceptable range.

If procedure 190 determines that the deviation in bolus size is an isolated event (branch Y), method 180 may take various actions. In some cases, the method may return directly to procedure 182, more immersion fluid may be added to existing bolus 52 to increase its size, and then procedures 184, 186, and 188 may be repeated. However, procedure 188 also may compare the size value to an error threshold, to determine whether bolus formation has failed more seriously (i.e., no bolus is detectable or the bolus is detectable but much too small). If so, remedial action may be taken, such as by initiating a cleaning routine, indicated at 194, before returning to procedure 182. The cleaning routine may include delivering excess immersion fluid to the front end of the objective, applying suction to remove fluid and/or clogs, wiping the objective or overlying sample holder, reversing the flow direction of the fluid delivery pump, or the like. Alternatively, or in addition, an error signal may be created and communicated (e.g., displayed to the user), indicated at 196. In some embodiments, the method may terminate at procedure 196, as service may be required.

If procedure 188 determines that the bolus has an acceptable size (branch Y), method 180 may proceed to sample imaging. Bolus 52 may be flattened, and an image of the sample focused, at procedure 198, by moving objective 56 and stage 66 relative to one another along a z-axis. An image(s) of the sample may be captured, at procedure 200. The objective and stage then may be moved relative to one another at procedure 202. In some embodiments, the movement may be small, in an xy plane and/or along a z-axis, such that the layer of immersion fluid does not need to be replaced, and then the method may return to procedure 200 to capture one or more additional images.

Alternatively, at procedure 202 the objective and stage may be moved apart from one another along a z-axis sufficiently to disrupt the layer of immersion fluid and create an air gap between the objective and sample holder. The objective and stage then may be moved relative to one another in an xy plane at procedure 202, to align the objective with a different sample or sample region, before or after return of the method to procedure 182.

IV. EXAMPLES

The following examples describe selected aspects and embodiments of imaging systems and methods for bolus formation and detection and/or sample imaging. These aspects and embodiments are intended for illustration and should not limit the entire scope of the present disclosure.

Example 1. Imaging System with Dedicated Light Source and Sensor for Boluses

Figure 6:
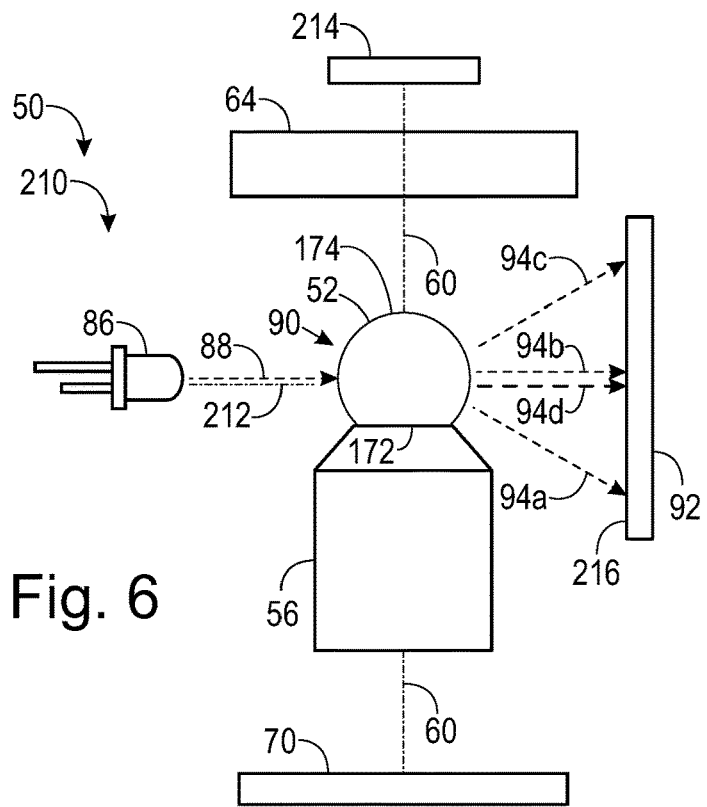
FIG. 6 is a schematic view of an exemplary embodiment of a bolus detection configuration for the imaging system of FIG. 1, with the configuration incorporating a dedicated light source for illumination of boluses and a dedicated optical sensor to detect light from the illuminated boluses, in accordance with aspects of the present disclosure.

This example describes an exemplary embodiment 210 of imaging system 50 (see FIG. 1) having a dedicated light source 86 for illumination of a bolus 52 and a dedicated optical sensor 92 to detect light from the illuminated bolus; see FIG. 6.

Imaging system 210 may have any suitable combination of the components and features described elsewhere in the present disclosure, such as in other examples of this section and in Sections I, II, and III. Only selected aspects of the system are illustrated here for simplification.

Bolus light source 86 may be arranged to illuminate bolus 52 with illumination light 88 that propagates along a bolus illumination axis 212 to the bolus. Axis 212 may be oblique or parallel (as shown here) to a horizontal plane intersecting bolus 52, and may (or may not) intersect optical axis 60. Bolus light source 86 generates illumination light 88 that is incident on rounded outer surface 174 of bolus 52.

Imaging system 210 may detect light from bolus light source 86 that has emerged from bolus 52, and/or that has been reflected externally and/or internally by outer surface 174, using only one sensor device, such as bolus sensor 92, or with at least two sensor devices, such as bolus sensor 92 and sample sensor 70, or bolus sensor 92 and a trans-sensor 214, among others. Accordingly, the imaging system may detect light originating from bolus light source 86 that has emerged from (and/or been reflected by) rounded outer surface 174 using bolus sensor 92 and/or trans-sensor 214. Also or alternatively, the imaging system may detect light from bolus light source 86 that has emerged from inner surface 172 of bolus 52 using sample sensor 70. Trans-sensor 214 may be located on optical axis 60 and positioned such that sample holder 64 is between objective 56 and trans-sensor 214 along axis 60.

Bolus sensor 92 may have any suitable position, orientation, and structure. Sensor 92 may be intersected by illumination axis 212. The bolus sensor may have a photosensitive detection area 216 that is orthogonal (as shown here) or oblique to axis 212. The bolus sensor may have a one-dimensional array or a two-dimensional array of photosensitive elements creating detection area 216. If the sensor has a one-dimensional array of such elements, the elements may be arranged along a line that is vertical, as shown here, or oblique to vertical, among others.

In any event, bolus sensor 92 may be configured to detect changes in bolus size as differential refraction of light from bolus light source 86 to different positions on bolus sensor 92. Exemplary changes in position for different sizes of bolus 52 are shown with detected light 94*a-d*. The bolus may act as a lens, such that incident illumination light is refracted by a small bolus, a medium bolus, and a large bolus, to respective lower, intermediate, and higher positions on bolus sensor 92, as indicated respectively with detected light 94*a-c*. The absence of a bolus, which may be caused by a system error (e.g., pump failure, a clogged channel, insufficient immersion fluid available for delivery, or the like) allows light to propagate from bolus light source 86 to bolus sensor 92 without substantial refraction/scattering, as indicated by light 94*d*. The failure to form a bolus (e.g., light 94*d*) may be distinguishable from a bolus that transmits light to a similar position on bolus (e.g., light 94*b*) by detection of light at a higher intensity and/or in a more focused region on bolus sensor 92. Alternatively, or in addition, the relative amounts of light detected by bolus sensor 92 and another sensor (70 and/or 214) may facilitate determining the size and/or presence/absence of a bolus.

Figure 7:
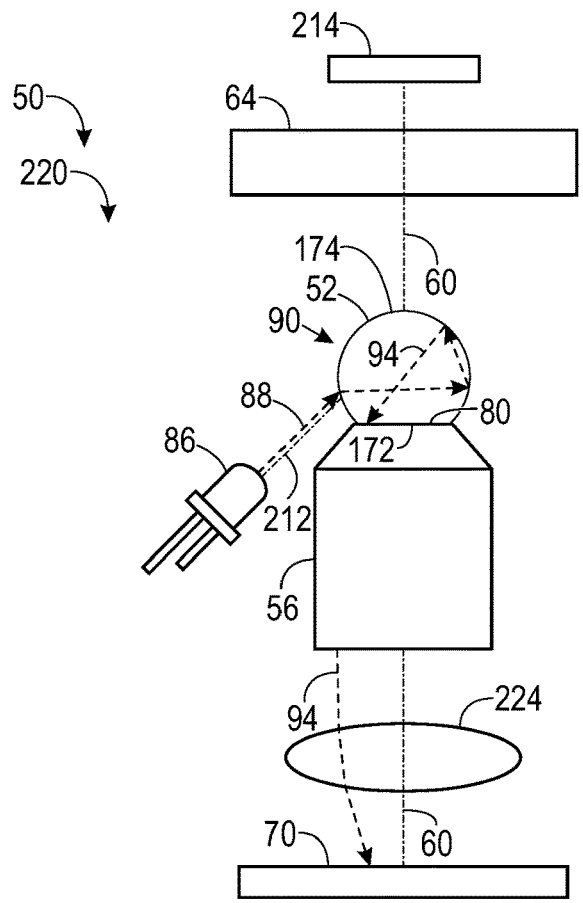
FIG. 7 is a schematic view of another exemplary embodiment of a bolus detection configuration for the imaging system of FIG. 1, with the configuration incorporating a dedicated light source for illumination of boluses and a shared image sensor to detect light (at different times) from the illuminated boluses and samples that are being imaged, in accordance with aspects of the present disclosure.
Figure 8:
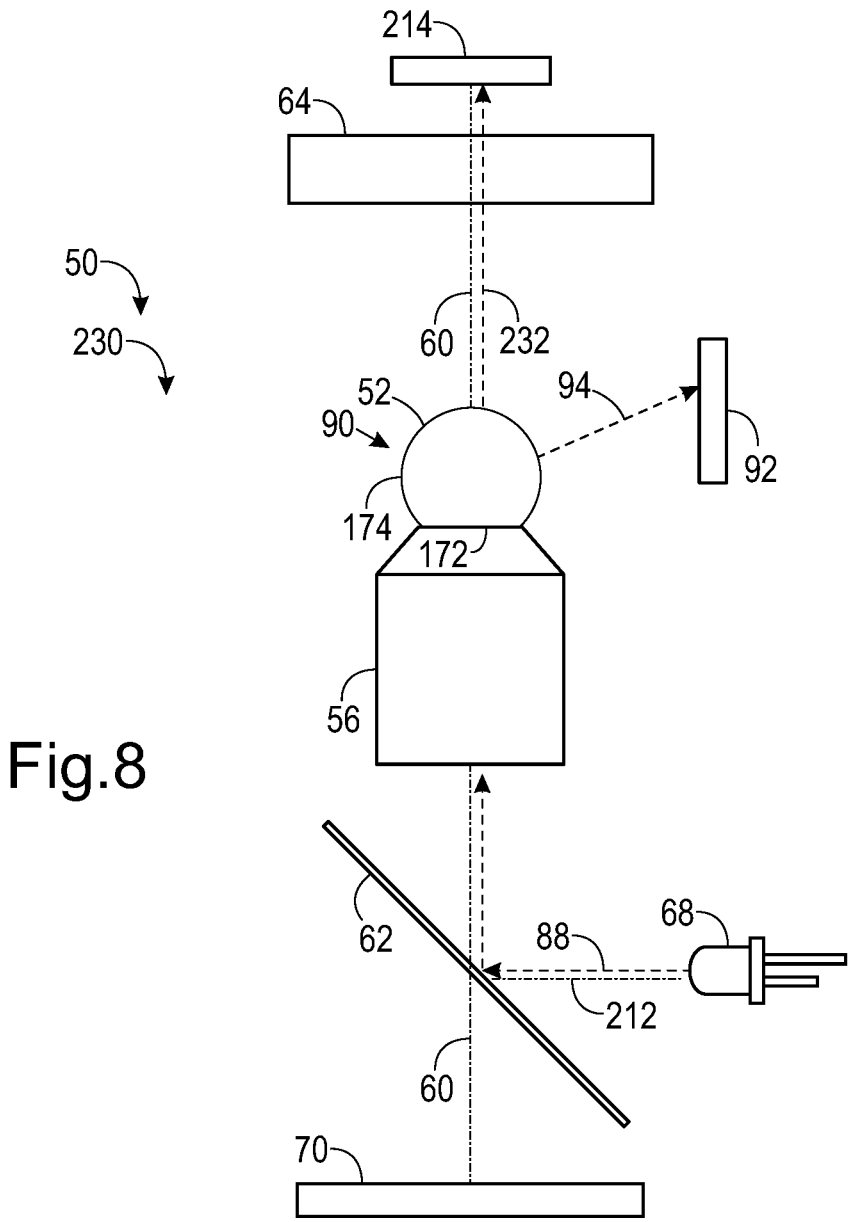
FIG. 8 is a schematic view of yet another exemplary embodiment of a bolus detection configuration for the imaging system of FIG. 1, with the configuration incorporating a shared light source for epi-illumination of boluses and samples that are being imaged, and a dedicated optical sensor to detect light from the boluses, in accordance with aspects of the present disclosure.

Example 2. Imaging System with Dedicated Light Source and Shared Sensor for Boluses This example describes an exemplary embodiment 220 of imaging system 50 (see FIG. 1) having a dedicated light source 86 for illumination of a bolus 52 and a shared image sensor 70 for capturing an image of illuminated bolus 52 and images of samples; see FIG. 7.

Imaging system 220 may have any suitable combination of the components and features described elsewhere in the present disclosure, such as in other examples of this section and in Sections I, II, and III. Only selected aspects of the system are illustrated here for simplification.

Bolus light source 86 may illuminate bolus 52 with illumination light 88 that propagates to the bolus along an illumination axis 212 that is oblique (as shown here) or parallel to a horizontal plane. The light source may, for example, illuminate bolus 52 from a position below front end 80 of objective 56 (for an inverted microscope, as shown) or from above front end 80 (for a conventional microscope). Accordingly, light source 86 may be arranged such that illumination light 88 propagates upward (or downward) to bolus 52. In any event, the light source may be arranged such that at least a portion of illumination light 88 is incident on, and propagates through, rounded outer surface 174. Detected light 94 originating from light source 86 may be internally reflected by outer surface 174 (and/or scattered inside bolus 52) such that the detected light propagates through inner surface 172 and objective 56, and is incident on image sensor 70. Objective 56 may be infinity-corrected, and a tube lens 224 may focus detected light 94 onto image sensor 70. The position(s) at which detected light 94 is incident on image sensor 70 may change according to the size of bolus 52, and thus allows determination of the size. Trans-sensor 214 also may be utilized as described in Example 1. Here, trans-sensor 214 may be on optical axis 60 or may be on illumination axis 212 when this axis is extended linearly past the objective.

Example 3. Imaging Systems with Shared Light Source and Dedicated Optical Sensor for Boluses This example describes exemplary embodiments 230, 230a of imaging system 50 (see FIG. 1) having a shared light source 68 for illumination of a bolus 52 and samples, and a dedicated optical sensor 92 for detecting light from illuminated bolus 52; see FIGS. 8-13.

Imaging systems 230, 230a may have any suitable combination of the components and features described elsewhere in the present disclosure, such as in other examples of this section and in Sections I, II, and III. Only selected aspects of the system are illustrated here for simplification.

Imaging system 230 employs an epi-illumination path for propagation of illumination light 88 along illumination axis 212 to bolus 52. More specifically, illumination light 88 is reflected by beam-splitter 62 to a main leg of optical axis 60, passes through objective 56 and is incident on bolus 52 at inner surface 172 thereof. Detected light 94 may be incident on rounded outer surface 174 from inside the bolus, and may be refracted to a position on bolus sensor 92 that corresponds to the size of the bolus, generally as described above for imaging system 210 of FIG. 6. In contrast, light ray 231 that is closer to parallel to optical axis 60 may propagate to trans-sensor 214, which is optional, or may be reflected back to image sensor 70. Accordingly, the amount of light detected by sensor 92 alone, or detected by sensors 92 and 214 or sensors 92 and 70 may be utilized to calculate a size value for the bolus.

FIGS. 9-12 show objective 56 and bolus sensor 92 of imaging system 230 with respective increasing sizes of bolus 52 formed on the objective. A light ray 232 at the periphery enters bolus 52 at the same angle, with each bolus size, but emerges from the bolus as respective light rays 234a-d at a different angle for each size of bolus. Accordingly, the position on bolus sensor 92 at which light is detected will vary according to the bolus size. In this example, a greater percentage of the light will be detected higher on bolus sensor 92 as the size of the bolus increases, since light rays 234a-d as depicted represent the lower boundary for light detection.

Figure 13:
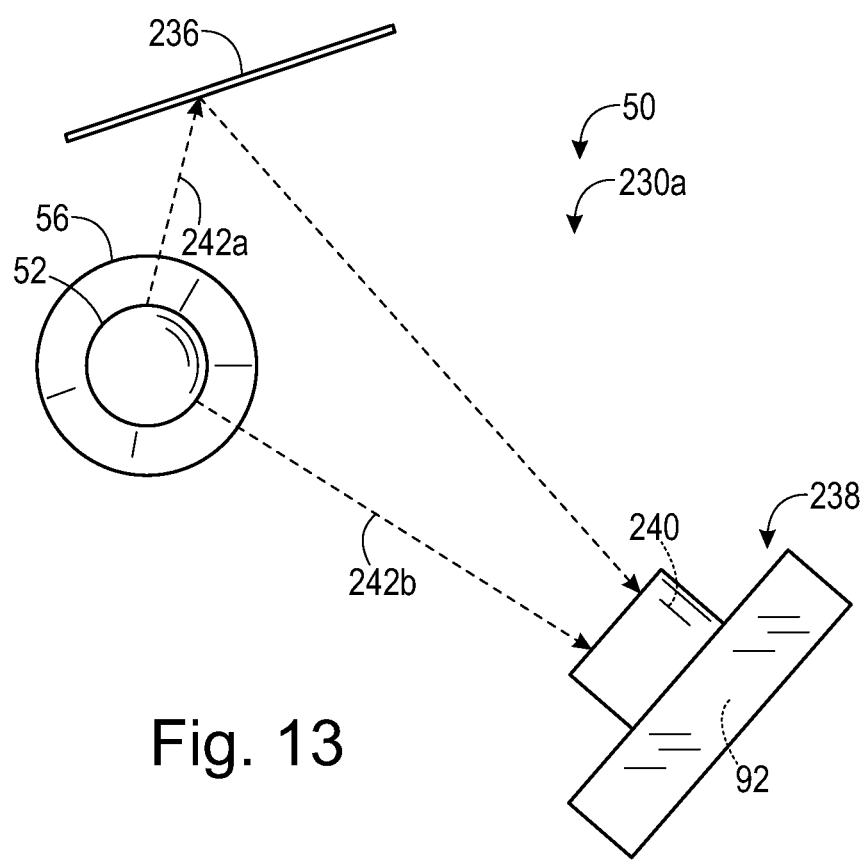
FIG. 13 is an axial view of a modified form of the embodiment of FIG. 8 in which the optical sensor is replaced with a reflective screen and a camera, in accordance with aspects of the present disclosure.

FIG. 13 shows a top view of selected aspects of imaging system 230a, which is similar to imaging system 230 except that system 230a also includes a reflective screen 236 and a camera 238. The camera has an integrated camera objective 240 and bolus sensor 92. Only bolus 52, microscope objective 56, screen 236, and camera 238 are shown, with representative emergent light rays 242a, 242b from bolus 52 labeled. Camera may have a wide field of view that allows capture of an image of screen 236 formed with light rays 242a and of bolus 52 formed with light rays 242b. In other embodiments, an external light may be utilized to view the objective and bolus profile against a diffusive screen.

Example 4. Selected Embodiments

This example describes selected embodiments of the present disclosure as a series of indexed paragraphs.

Paragraph 1. A method of bolus formation and detection with a microscope imaging system, the method comprising: (a) delivering immersion fluid onto a front end of an objective of the imaging system to form one or more boluses; (b) illuminating at least a portion of each bolus; (c) detecting light from each illuminated bolus to create detection data; and (d) determining whether a value representing a size of each bolus using the detection data.

Paragraph 2. The method of paragraph 1, wherein each of the one or more boluses has a rounded outer surface forming an interface with air and intersected by an optical axis defined by the objective.

Paragraph 3. The method of paragraph 1 or 2, the one or more boluses being one or more previous boluses, the method further comprising repeating delivering with an adjusted volume of the immersion fluid to form one or more subsequent boluses, if the value(s) determined for one or more of the previous boluses meets one or more predefined criteria.

Paragraph 4. The method of paragraph 3, wherein repeating delivering includes delivering immersion fluid for a different length of time and/or at a different rate of flow for each of the one or more subsequent boluses relative to each of the previous boluses.

Paragraph 5. The method of paragraph 3 or 4, wherein delivering immersion fluid is performed using a fluid delivery system controlled by a processor, and wherein operation of the fluid delivery system is adjusted for formation of the one or more subsequent boluses by the processor, if the processor finds that the value(s) determined for the one or more previous boluses meets the one or more predefined criteria.

Paragraph 6. The method of any of paragraphs 1 to 5, wherein the one or more boluses include a single bolus, the method further comprising: comparing the value determined for the single bolus to one or more thresholds; and adding more immersion fluid to the single bolus if comparing satisfies one or more predefined criteria.

Paragraph 7. The method of paragraph 6, wherein adding is performed to enlarge the single bolus to a target size for use in sample imaging if comparing indicates that the single bolus is larger than a threshold size but smaller than the target size.

Paragraph 8. The method of paragraph 6, wherein adding includes adding a volume of immersion fluid sufficient to overcome surface tension that retains the single bolus on the front end of the objective, such that at least a portion of the single bolus flows off the front end of the objective.

Paragraph 9. The method of any of paragraphs 1 to 8, the method further comprising moving the objective and a stage of the imaging system relative to one another along a z-axis to create contact between immersion fluid of at least one of the boluses and a sample holder supported by the stage.

Paragraph 10. The method of paragraph 9, the method further comprising capturing an image of a sample supported by the sample holder while a layer of immersion fluid from one of the boluses is sandwiched between the front end of the objective and the sample holder.

Paragraph 11. The method of any of paragraphs 1 to 10, the method further comprising signaling an error to a user if the value determined for a bolus of the one or more boluses satisfies a predefined condition.

Paragraph 12. The method of any of paragraphs 1 to 11, wherein illuminating includes illuminating each bolus with light that propagates to the bolus along an illumination axis oriented obliquely or parallel to a horizontal plane.

Paragraph 13. The method of paragraph 12, wherein detecting uses an optical sensor to detect light that has propagated from each bolus to the optical sensor without passing through the objective downstream of the bolus.

Paragraph 14. The method of paragraph 12, wherein detecting uses an optical sensor to detect light that has propagated from each bolus to the optical sensor via the objective.

Paragraph 15. The method of any of paragraphs 1 to 11, wherein illuminating includes illuminating each bolus with light that propagates through the objective upstream of the bolus.

Paragraph 16. The method of paragraph 15, wherein detecting uses an optical sensor to detect light that has propagated from the bolus to the optical sensor without passing through the objective downstream of the bolus.

Paragraph 17. The method of any of paragraphs 1 to 16, wherein the value is a size value, wherein detecting is performed with at least one optical sensor, and wherein determining includes calculating a detection value from the detection data, the detection value representing a characteristic of the light detected by the at least one optical sensor.

Paragraph 18. The method of paragraph 17, wherein the detection value corresponds to a location, distribution, and/or intensity of light detected by the at least one optical sensor.

Paragraph 19. The method of paragraph 17 or 18, wherein determining includes obtaining the size value from the detection value using a function or look-up table that describes a relationship between bolus size values and detection values.

Paragraph 20. The method of paragraph 19, wherein the function or look-up table represents calibration data obtained by forming boluses of different sizes (optionally known sizes) and detecting light with the at least one optical sensor for each bolus of different size.

Paragraph 21. A method of bolus formation and detection with a microscope imaging system, the method comprising: (a) signaling a fluid delivery system to deliver immersion fluid onto a front end of an objective of the imaging system in order to form one or more boluses each having a respective target size; (b) illuminating a space that each bolus should overlap if the bolus has the target size; (c) detecting light from the illuminated space when each bolus is expected to be present in the space; and (d) determining, based on the light detected, whether each bolus is detectably present, whether each bolus has the respective target size, and/or a value corresponding to a size of each bolus.

Paragraph 22. The method of paragraph 21, wherein signaling and determining are performed with a processor.

Paragraph 23. The method of paragraph 21 or 22, wherein the one or more boluses have the same target size as one another.

Paragraph 24. The method of any of paragraphs 21 to 23, wherein the one or more boluses are a series of boluses of increasing size formed by adding more immersion fluid to each preceding bolus of the series.

Paragraph 25. The method of any of paragraphs 21 to 24, wherein detecting light creates detection data corresponding to each bolus expected to be formed in response to signaling, and wherein determining includes determining a value representing an actual size of each bolus using the detection data.

Paragraph 26. The method of any of paragraphs 21 to 24, further comprising any limitation or combination of limitations of paragraphs 1 to 25.

Paragraph 27. A microscope imaging system with automated bolus formation and detection, the system comprising: (a) a stage to support a sample holder; (b) an objective; (c) a fluid delivery system configured to deliver immersion fluid onto a front end of the objective to form one or more boluses; (d) a light source configured to produce light to illuminate at least a portion of each bolus; (e) at least one optical sensor configured to detect light from each illuminated bolus to create detection data; and (f) a processor configured to control operation of the fluid delivery system, and to determine a value representing a size of each bolus using the detection data.

Paragraph 28. The system of paragraph 27, wherein each bolus has a rounded outer surface forming an interface with air and intersected by an optical axis defined by the objective.

Paragraph 29. The system of paragraph 27 or 28, the one or more boluses being one or more previous boluses, wherein the processor is configured to control delivery of an adjusted volume of immersion fluid by the fluid delivery system to form one or more subsequent boluses, if the value(s) determined for one or more of the previous boluses meets one or more predefined criteria.

Paragraph 30. The system of paragraph 29, wherein the processor is configured to control delivering immersion fluid for a different length of time and/or at a different rate of flow by the fluid delivery system for each of the one or more subsequent boluses relative to each of the previous boluses.

Paragraph 31. The system of any of paragraphs 27 to 30, wherein the one or more boluses include a single bolus, wherein the processor is configured to compare the value determined for the single bolus to one or more thresholds and to cause addition of more immersion fluid to the single bolus by the fluid delivery system if comparing the value satisfies one or more predefined criteria.

Paragraph 32. The system of paragraph 31, wherein processor is configured to cause addition of more immersion fluid to the single bolus, to enlarge the bolus, if comparing the value indicates that the single bolus is larger than a threshold size but smaller than a target size.

Paragraph 33. The system of paragraph 31, wherein the processor is configured to cause addition of a volume of immersion fluid sufficient to overcome surface tension that retains the single bolus on the front end of the objective, such that at least a portion of the single bolus flows off the front end of the objective, if comparing the value indicates that the single bolus is smaller than a threshold size.

Paragraph 34. The system of any of paragraphs 27 to 33, further comprising an actuator controlled by the processor and configured to move the objective and the stage relative to one another along a z-axis to create contact between immersion fluid on the front end of the objective and a sample holder supported by the stage.

Paragraph 35. The system of paragraph 34, wherein the system includes an image sensor, and wherein the processor is configured to capture an image of a sample using image sensor, with the sample supported by the sample holder while a layer of immersion fluid from one of the boluses is sandwiched between the front end of the objective and the sample holder.

Paragraph 36. The system of paragraph 35, wherein the image sensor is an optical sensor of the at least one optical sensor.

Paragraph 37. The system of any of paragraphs 27 to 36, wherein the processor is configured to signal an error to a user using an output device of the imaging system if the value determined for one bolus of the one or more boluses satisfies a predefined condition.

Paragraph 38. The system of any of paragraphs 27 to 37, wherein the light source is configured to illuminate each bolus with light that propagates to the bolus along an illumination axis oriented obliquely or parallel to a horizontal plane.

Paragraph 39. The system of paragraph 38, wherein an optical sensor of the at least one optical sensor is configured to detect light that has propagated from each bolus to the optical sensor without passing through the objective downstream of the bolus.

Paragraph 40. The system of paragraph 38, wherein an optical sensor of the at least one optical sensor is configured to detect light that has propagated from each bolus to the optical sensor via the objective.

Paragraph 41. The system of any of paragraphs 27 to 37, wherein the light source is configured to illuminate each bolus with light that propagates through the objective upstream of the bolus.

Paragraph 42. The system of paragraph 41, wherein an optical sensor of the at least one optical sensor is configured to detect light that has propagated from the bolus to the optical sensor without passing through the objective downstream of the bolus.

Paragraph 43. The system of any of paragraphs 27 to 42, wherein the value is a size value, wherein the processor is configured to calculate a detection value from the detection data, the detection value representing a characteristic of the light detected by the at least one optical sensor.

Paragraph 44. The system of paragraph 43, wherein the detection value corresponds to a location, distribution, and/or intensity of light detected by the at least one optical sensor.

Paragraph 45. The system of paragraph 43 or 44, wherein the processor is configured to obtain the size value from the detection value using a function or look-up table that describes a relationship between bolus size values and detection values.

Paragraph 46. The system of paragraph 45, wherein the function or look-up table represents calibration data obtained by forming boluses of different sizes (optionally known sizes) and detecting light with the at least one optical sensor for each bolus of different size.

Paragraph 47. The system of any of paragraphs 27 to 46, wherein the processor is configured to control formation of boluses having different known volumes with the fluid delivery system, to obtain calibration data representing light detected by the at least one optical sensor from the boluses, and to determine the value representing a size of the bolus using the calibration data.

Paragraph 48. The system of any of paragraphs 27 to 46, configured to perform any method of paragraphs 1 to 26.

Paragraph 49. A microscope imaging system with automated bolus formation and detection, comprising: (a) a stage to support a sample holder; (b) an objective; (c) a fluid delivery system configured to deliver immersion fluid onto a front end of the objective in order to form one or more boluses each having a respective target size; (d) a light source configured to produce light to illuminate a space that each bolus should overlap if the bolus has the target size; (e) at least one optical sensor configured to detect light from the space when each bolus is expected to be present in the illuminated space; and (f) a processor configured to signal operation of the fluid delivery system to form the one or more boluses and to determine if each bolus is detectably present and/or has the respective target size based on the light detected.

Paragraph 50. The system of paragraph 49, further comprising any limitation or combination of limitations of paragraphs 27 to 47.

Paragraph 51. The system of paragraph 48 or 49, configured to perform any method of paragraphs 1 to 26.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A method of bolus formation and detection with a microscope imaging system, the method comprising:
    delivering, with a fluid delivery system, immersion fluid onto a front end of an objective of the imaging system to form one or more boluses;
    illuminating at least a portion of each bolus;
    detecting light from each illuminated bolus to create detection data;
    determining a value representing a volume of each bolus using the detection data;
    comparing the value determined for the one or more boluses to one or more thresholds;

identifying a drift in an operating efficiency of the fluid delivery system based on the comparison; and adding more immersion fluid to the one or more boluses based on the identified drift.

2. The method of claim 1, wherein each of the one or more boluses has a rounded outer surface forming an interface with air and intersected by an optical axis defined by the objective.

3. The method of claim 1, the one or more boluses being one or more previous boluses, the method further comprising repeating delivering with an adjusted volume of the immersion fluid to form one or more subsequent boluses, if the value(s) determined for one or more of the previous boluses meets one or more predefined criteria.

4. The method of claim 3, wherein repeating delivering includes delivering immersion fluid for a different length of time and/or at a different rate of flow for each of the one or more subsequent boluses relative to each of the previous boluses.

5. The method of claim 3, wherein delivering immersion fluid is performed using the fluid delivery system controlled by a processor, and wherein operation of the fluid delivery system is adjusted for formation of the one or more subsequent boluses by the processor, if the processor finds that the value(s) determined for the one or more previous boluses meets the one or more predefined criteria.

6. The method of claim 1, wherein the one or more boluses include a single bolus, the method further comprising:

comparing the value determined for the single bolus to one or more thresholds; and adding more immersion fluid to the single bolus if comparing satisfies one or more predefined criteria.

7. The method of claim 6, wherein adding includes adding a volume of immersion fluid sufficient to overcome surface tension that retains the single bolus on the front end of the objective, such that at least a portion of the single bolus flows off the front end of the objective.

8. The method of claim 1, the method further comprising moving the objective and a stage of the imaging system relative to one another along a z-axis to create contact between immersion fluid of at least one of the boluses and a sample holder supported by the stage.

9. The method of claim 8, the method further comprising capturing an image of a sample supported by the sample holder while a layer of immersion fluid from one of the boluses is sandwiched between the front end of the objective and the sample holder.

10. The method of claim 1, the method further comprising signaling an error to a user if the value determined for a bolus of the one or more boluses satisfies a predefined condition.

11. The method of claim 1, wherein illuminating includes illuminating each bolus with light that propagates to the bolus along an illumination axis oriented obliquely or parallel to a horizontal plane.

12. The method of claim 11, wherein detecting uses an optical sensor to detect light that has propagated from each bolus to the optical sensor without passing through the objective downstream of the bolus.

13. The method of claim 11, wherein detecting uses an optical sensor to detect light that has propagated from each bolus to the optical sensor via the objective.

14. The method of claim 1, wherein illuminating includes illuminating each bolus with light that propagates through the objective upstream of the bolus.

15. The method of claim 14, wherein detecting uses an optical sensor to detect light that has propagated from the bolus to the optical sensor without passing through the objective downstream of the bolus.

16. A method of bolus formation and detection with a microscope imaging system, the method comprising:

signaling a fluid delivery system to deliver immersion fluid at a first delivery parameter onto a front end of an objective of the imaging system in order to form one or more boluses each having a respective target size;

illuminating a space that each bolus should overlap if the bolus has the target size;

detecting light from the illuminated space when each bolus is expected to be present in the space;

determining a value representing a volume of each bolus based on the light detected;

comparing the value determined for each bolus to a plurality of previously-determined values;

identifying a drift in an operating efficiency of the fluid delivery system based on the comparison; and changing the first delivery parameter of the fluid delivery system to an updated delivery parameter based on the identified drift.

17. The method of claim 16, further comprising determining whether each bolus is detectably present based on the light detected.

18. A microscope imaging system with automated bolus formation and detection, the system comprising:

a stage to support a sample holder;

an objective;

a fluid delivery system configured to deliver immersion fluid onto a front end of the objective plateau to form one or more boluses;

a light source configured to produce light to illuminate at least a portion of each bolus;

at least one optical sensor configured to detect light from each illuminated bolus to create detection data; and a processor configured to:

control operation of the fluid delivery system;

determine a value representing a volume of each bolus using the detection data;

identify a drift in an operating efficiency of the fluid delivery system based on a comparison of the value to a plurality of previously-determined values; and change a delivery parameter of the fluid delivery system to an updated delivery parameter based on the identified drift.

19. The system of claim 18, wherein each bolus has a rounded outer surface forming an interface with air and intersected by an optical axis defined by the objective.

20. The system of claim 18, the one or more boluses being one or more previous boluses, wherein the processor is configured to control delivery of an adjusted volume of immersion fluid by the fluid delivery system to form one or more subsequent boluses, if the value(s) determined for one or more of the previous boluses meets one or more predefined criteria.

21. The system of claim 20, wherein the processor is configured to control delivering immersion fluid for a different length of time and/or at a different rate of flow by the fluid delivery system for each of the one or more subsequent boluses relative to each of the previous boluses.

* * * * *